(12) United States Patent
Subramanian et al.

(10) Patent No.: US 10,862,903 B2
(45) Date of Patent: Dec. 8, 2020

(54) STATE GROUPING METHODOLOGIES TO COMPRESS TRANSITIONS IN A DETERMINISTIC AUTOMATA

(71) Applicant: MaxLinear, Inc., Carlsbad, CA (US)

(72) Inventors: Shiva Shankar Subramanian, Singapore (SG); Pinxing Lin, Singapore (SG)

(73) Assignee: MaxLinear, Inc., Carlsbad, CA (US)

( * ) Notice: Subject to any disclaimer, the term of this patent is extended or adjusted under 35 U.S.C. 154(b) by 719 days.

(21) Appl. No.: 15/454,274

(22) Filed: Mar. 9, 2017

(65) Prior Publication Data

US 2018/0262518 A1  Sep. 13, 2018

(51) Int. Cl.
*H04L 29/06* (2006.01)

(52) U.S. Cl.
CPC ...... *H04L 63/1416* (2013.01); *H04L 63/0245* (2013.01); *H04L 63/0254* (2013.01); *H04L 63/1441* (2013.01)

(58) Field of Classification Search
CPC ............... H04L 63/1416; H04L 43/028; H04L 63/0254; H04L 63/1441; H04L 63/0245; H04L 67/10
See application file for complete search history.

(56) References Cited

U.S. PATENT DOCUMENTS

| | | | |
|---|---|---|---|
| 5,606,690 A | 2/1997 | Hunter et al. | |
| 6,018,735 A | 1/2000 | Hunter | |
| 9,083,740 B1 * | 7/2015 | Ma | H04L 63/1408 |
| 10,110,563 B1 * | 10/2018 | Ganesh | H04L 63/0263 |
| 2008/0271141 A1 | 10/2008 | Goldman et al. | |
| 2010/0229238 A1 * | 9/2010 | Ma | H04L 63/1416 726/23 |

\* cited by examiner

*Primary Examiner* — Baotran N To
(74) *Attorney, Agent, or Firm* — Maschoff Brennan

(57) ABSTRACT

A hardware system for signature matching in a distributed network is disclosed. The hardware system comprises a network processor and a memory. The network processor is configured to perform horizontal compression on a state table using bitmaps, wherein the state table has a plurality of states and state transitions. The processor is also configured to perform a first grouping of states of the state table using the bitmaps to generate a first one or more sets of states, perform a second grouping of states of the state table based on the first one or more sets of states and a transition threshold to generate a second one or more sets of states, perform a conquer step grouping of the states of the state table based on the second one or more sets of states and conquer criteria to generate third one or more sets of states, and generate a two dimensional compressed state table based on the third one or more sets of states. The memory circuit is configured to store the two dimensional compressed state table.

16 Claims, 15 Drawing Sheets

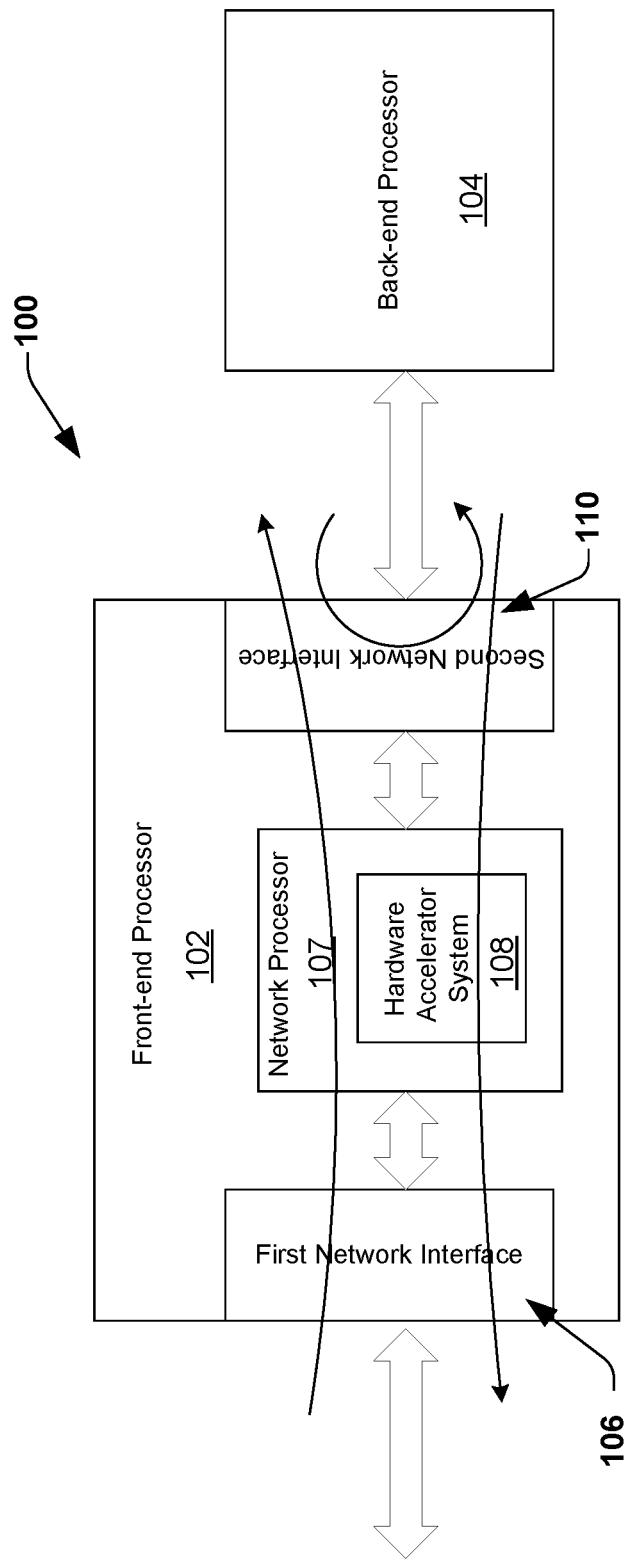
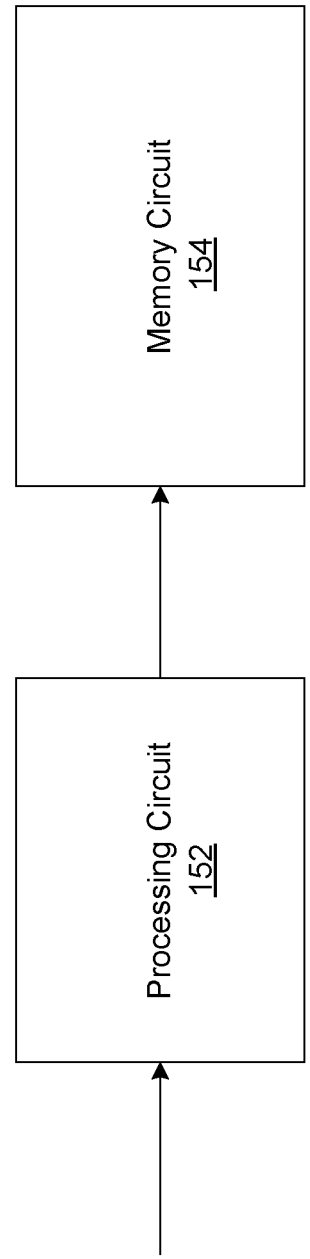
FIG. 1a
FIG. 1b

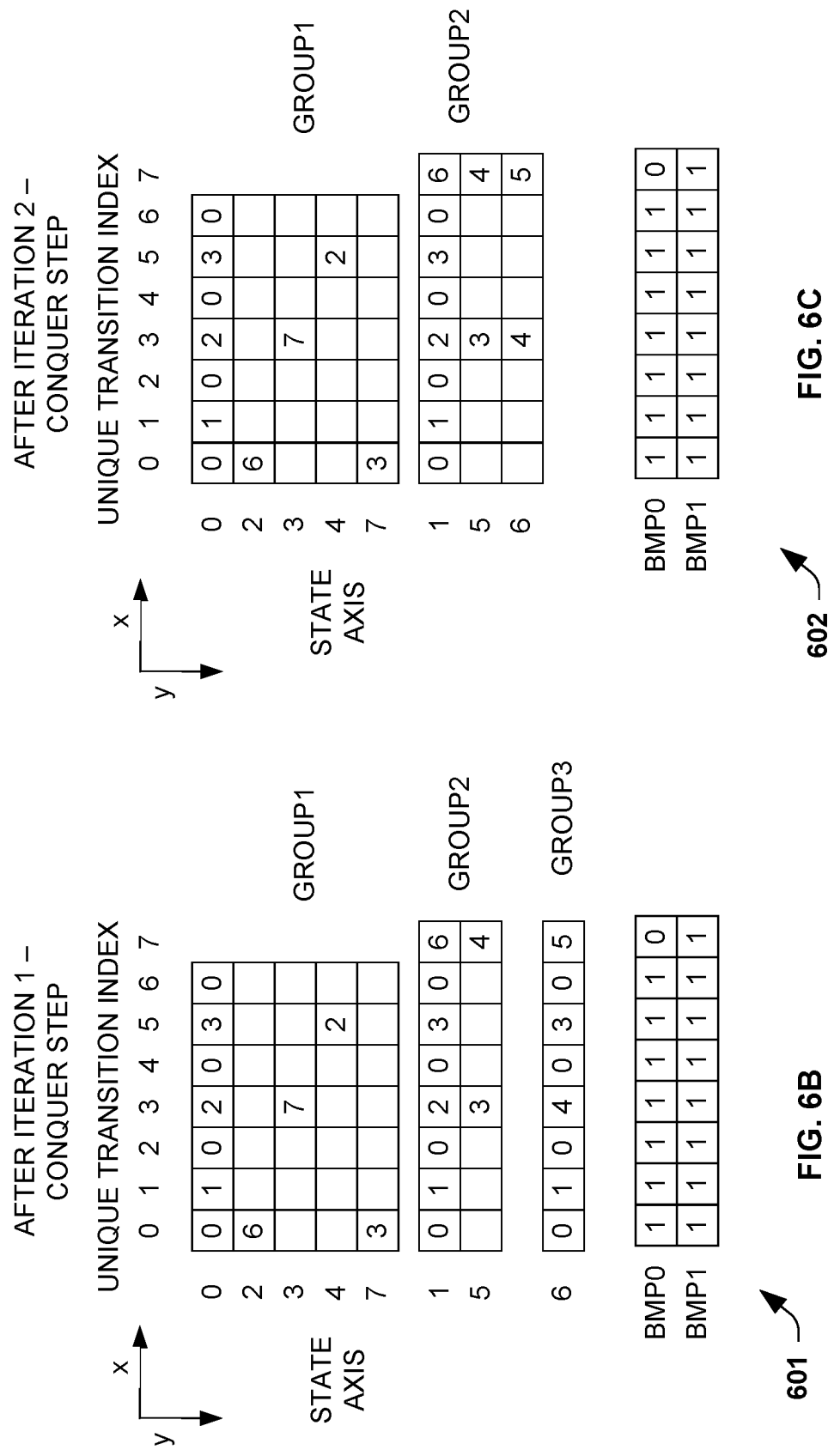

```
Procedure combine_state_sets(state set M) {
  // Initialization
  // calculate total #Uncompressed transitions after vertical compression in each group
  For each state set(i in M) {
    total_trans[i]=#transitions_after_2_stage_compression;
    // Indicates that the group hasn't been combined with another group yet
    combined[i]=0;
    to_be_combined_with[i]=i;                                    ◀— 701
  } // end for loop // conquer step
  conquer_step_done=0;
  total_sets=total_sets(M);
  While (conquer_step_done == 0) {
    sets_before_conquer=total_sets;
    for (set i in M) {                              ◢— 702
      for (set j in M) {
        if(!combined[i] && !combined[j] && (i != j) && (bitmap[i] == bitmap[j])) {
        // Calculate uncompressed transitions after vertical compression when 2 groups combined together
          total_trans[i+j]=#transitions_after_2_stage_compression;
          If( total_trans[i]+total_trans[j] > total_trans[i+j] ) {
            if(to_be_combined_with[i]=i ) {// check if it's the first positive comparison
              best_combo=total_trans[i+j];
              to_be_combined_with[i]=j; // i combined with j
            } else {
              If(total_trans[i+j] < best_combo) { to_be_combined_with[i]=j; }
            } // end of if else loop
          } // end of total_trans comparison if loop
        } // end of for loop j If(to_be_combined_with[i] != i) {                      ◢— 703
      combine state set i with to_be_combined_with[i];
      update total_trans[to_be_combined_with[i]]
      combined[to_be_combined_with[i]]=1;
      total_sets--;
    }
  } // end of for loop i
                                              ◢— 704
  If(#sets_before_conquer == total_sets) {
    conquer_step_done=1;
  }
} // end of while loop
} // End procedure
```

```
Procedure identify_best_leader(state set K) {
        // Initialization                                    ← 804
        // default_leader_state is the leader state in the group before the best leader state
is identified
        best_leader=default_leader_state;
        best_transitions=total_member_transitions[current_leader_state]

for (state i in set K) {
805 →           // Calculate the total member transitions with each state
                total_member_trans[i]=total #member_transitions stored after vertical
compression with state i as leader state If(best_transitions > total_member_trans[i]) {
                        best_leader=i;
                        best_transitions=total_member_trans[i];
                }
        }
        updated_leader_state=best_leader;
}
```

STATE GROUPING METHODOLOGIES TO COMPRESS TRANSITIONS IN A DETERMINISTIC AUTOMATA

FIELD

The present disclosure relates to deep packet inspection (DPI) methodologies in distributed network systems and in particular, to an architecture and a method that facilitates grouping and transition compression in DPI methodologies.

BACKGROUND

Modern networks are increasingly becoming content aware to improve data delivery and security via content-based network processing. Content-aware processing at the front end of distributed network systems include applications such as application identification for quality of service applications and deep packet inspection for various security application like anti malware. Deep packet inspection (DPI) methodologies are used to match transport layer data with a database of signatures, a predefined pattern that defines an attack. DPI methodologies inspect the payload portions of a data stream and use signatures to be matched along with specific header matches in the traffic stream. Matching signatures in a data stream is computationally a challenging task as the location of the signature could be anywhere in the incoming traffic stream.

In signature matching, the signatures are grouped into subgroups and the grouped signatures are combined to create a finite automaton which is understood by machines and the network traffic is compared with the automata to detect any attack in the network. Finite automata is differentiated into non-deterministic finite automata (NFA) and deterministic finite automata (DFA). Due to the flexibility and scalability of solutions, DFA based solutions are preferred for signature matching in case of deep packet inspection application. However, memory usage of DFAs can be prohibitively large.

BRIEF DESCRIPTION OF THE DRAWINGS

Some examples of circuits, apparatuses and/or methods will be described in the following by way of example only. In this context, reference will be made to the accompanying Figures.

FIG. 1a depicts a typical architecture of a distributed network system that facilitates deep packet inspection (DPI), according to one embodiment of the disclosure.

FIG. 1b depicts a hardware accelerator that facilitates deep packet inspection in distributed networks, according to one embodiment of the disclosure.

FIGS. 6A, 6B and 6C provide an example of grouping states based on a conquer step or conquer step grouping.

FIG. 7 is an example of suitable pseudocode for conquer step in accordance with one embodiment of the disclosure.

FIG. 8 is an example of suitable pseudocode to identify a leader state from states or member states of a set.

DETAILED DESCRIPTION

Figure 1C:
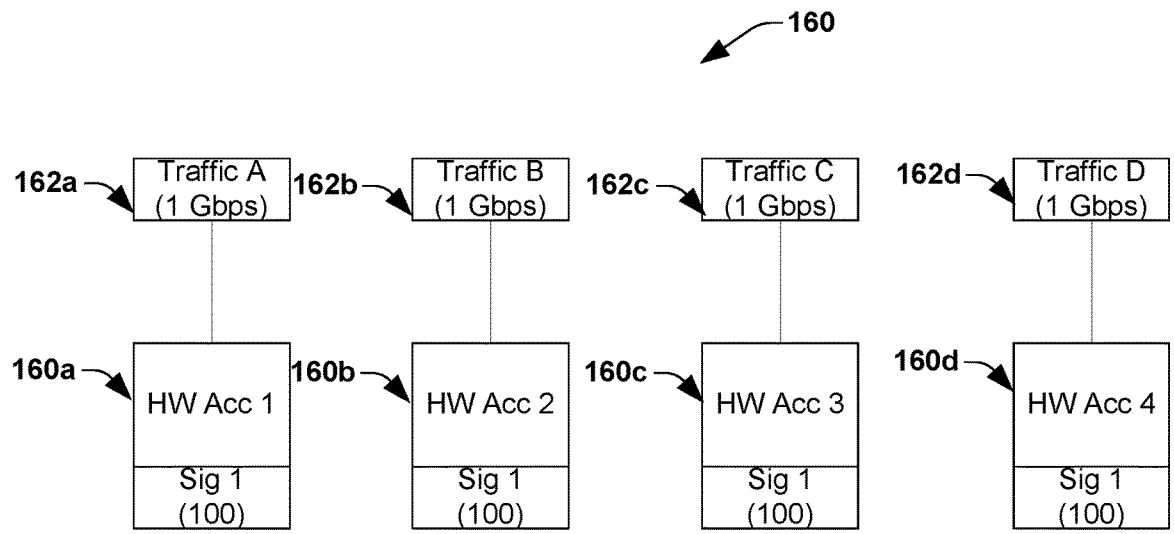
FIG. 1c comprises a signature matching hardware accelerator system comprising four hardware accelerator circuits, according to one embodiment of the disclosure.

The present disclosure will now be described with reference to the attached drawing figures, wherein like reference numerals are used to refer to like elements throughout, and wherein the illustrated structures and devices are not necessarily drawn to scale.

As utilized herein, terms "component," "system," "interface," "circuit" and the like are intended to refer to a computer-related entity, hardware, software (e.g., in execution), and/or firmware. For example, a component can be a processing circuit (e.g., a microprocessing circuit, a controller, or other processing device), a process running on a processing circuit, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processing circuits. The one or more processing circuits can be internal or external to the apparatus and can execute at least a part of the software or firmware application. As yet another example, a component can be an apparatus that provides specific functionality through electronic components without mechanical parts; the electronic components can include one or more processing circuits therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

The Open System Interconnection (OSI) model defines a networking framework to implement protocols in seven layers. The layers (L) include L1 physical, L2 data link, L3 network, L4 transport, L5 session, L6 presentation and L7 application. The layers communicate and interact with other layers using packets, which include header and data portions.

Packet Inspection methodologies can vary depending on a depth of the layer, such as L7 layer, at which the network packets are inspected. Shallow packet inspection (SPI) methodologies inspect OSI L2 to L4 headers to determine a decision on post processing policy to be applied to the packet or flow. Medium depth packet inspection (MPI) methodologies inspect L5 to L7 headers along with L2 to L4 headers. The DPI methodologies inspect packets at all layers from L2 to L7, including header and data portions of the packets.

SPI and MPI methodologies look for information at predefined locations of the network packets as they typically follow a fixed header structure, as defined by a protocol. Thus, the address location of the information being searched is known. On the other hand, since DPI involves search of information in the payload portion of the packet, the location of the information within the packet being searched is not known beforehand. Each individual byte of a packet is searched with a set of signatures. This increases the computational complexity of the deep packet inspection process.

Multiple signatures are compared with the network packet traces at same time in case of DPI. Generally in order to make the comparison process efficient, signatures are combined into an automata (state machine) and the incoming network packet payloads are compared with the automata rather than individual signatures. An automata is constructed as a 2 dimensional state table with states in the Y axis and ASCII characters in the X axis. The table is constructed with ASCII characters in X axis as there are 256 possible characters which can occur in the internet traffic. The number of states in the Y axis depends on the number of signatures and special patterns in the signatures. The special patterns include wildcards, length restrictions, and the like.

In some embodiments, DPI methodologies include preprocessing of data, packet reordering, signature matching and data post processing. Out of this, signature matching is the most computationally challenging task as each incoming byte of the data stream has to be matched with a database of signatures and is often the bottleneck in achieving higher packet processing in distributed network systems. Further, DPI in network devices like routers has to be performed at wire-speed as the data stays in the device for a very short time and the data packets has to be forwarded to the destination quickly without clogging the device.

With the increasing bandwidth and low-latency requirements for DPI, hardware acceleration of signature matching is essential to provide better service to the end clients with DPI enabled in the system. Due to predictable and acceptable memory bandwidth requirements, deterministic finite automata (DFA) based solutions are generally used for signature matching in case of deep packet inspection applications. The DFA comprises a state table representing the database of digital signatures defined by a plurality of states and a plurality of characters and having a plurality of next state transitions for each state. However, the DFA requires a large memory to store the next state transitions. Therefore, for efficient hardware implementation of signature matching, the DFA is compressed.

Typically, there is redundancy in the DFA table. The redundancy can be utilized to compress the DFA. In one approach, DFA compression techniques are used that identify the DFA state transitions that are similar across multiple states and compress the redundant transitions at the cost of memory bandwidth. Other approaches utilize software based implementations that achieve compression, but at the cost of huge memory bandwidth where multiple states have to be fetched to calculate the correct next state transition. Huge memory bandwidth results in multiple memory lookups because of which high throughput DPI cannot be achieved.

Therefore, a hardware friendly implementation of a compression technique is proposed in this disclosure. The implementation involves a two dimensional compression algorithm that includes a first process to compress state transitions and a second process that groups states to facilitate compression. Redundant transitions are compressed and a resulting automata or compressed state table is stored in memory. The resulting automata can be used for DPI and other packet inspection methodologies. The grouping of the states to facilitate compression involves determining sets and subsets of states having similar transitions.

FIG. 1a depicts a typical architecture of a distributed network system 100 that facilitates deep packet inspection (DPI), according to one embodiments of the disclosure. In some embodiments, the distributed network system 100 can comprise host based systems, for example, a server or a client machine, and in other embodiments, the distributed network system 100 can comprise network based systems, for example, router. The distributed network system 100 comprises a front-end processor 102 and a back end processor 104. In some embodiments, the front-end processor 102 in the distributed network system 100 enables to perform deep packet inspection (DPI) of incoming network data in order to find, identify, classify, reroute or block data packets with specific data or code payloads. In some embodiments, the DPI methodologies are used to match transport layer data with a database of signatures, a predefined pattern that defines an attack.

In some embodiments, the front-end processor 102 comprises a first network interface circuit 106 configured to receive the network traffic, a network processor circuit 107 configured to process the incoming network traffic and a second network interface circuit 110 configured to forward the processed network traffic to the back-end processor 104 for further processing, based on the processing result at the network processor circuit 107. In some embodiments, the front-end processor 102 can have bi-directional data transfer, where data (i.e., network traffic) from the back-end processor 104 can further flow from the second network interface circuit 110 to the first network interface circuit 106. In such embodiments, the network processor circuit 107 is configured to process the data coming from both the directions. In some embodiments, the network processor circuit 107 comprises a signature matching hardware accelerator system 108 configured to store a database of signatures and compare the incoming network data with the database of signatures, in order to perform the DPI. In some embodiments, based on the result of the DPI, the front-end processor 102 comprising the network processor circuit 107 can take an informed decision on whether to forward the incoming data traffic to the back-end processor 104 for further processing or to be dropped. In some embodiments, the signature matching hardware accelerator system 108 is configured to match the incoming network traffic (e.g., transport layer data) with a deterministic finite automata (DFA) comprising a state table representing the database of signatures, in order to perform the deep packet inspection.

In some embodiments, the first network interface circuit 106 can comprise a plurality of network interfaces or ports, with data transfer between one or more network interfaces in the plurality of network interfaces. In some embodiments, the ports are capable of accepting and sending network traffic. In such embodiments, the network processor 107 comprising the signature matching hardware accelerator system 108 is configured to receive the network traffic from one of the ports of the first network interface circuit 106 and perform DPI on the received network traffic, before forwarding the network traffic to a subsequent port within the first network interface circuit 106 or second network interface circuit 110. In some embodiments, a decision whether to forward the network traffic or drop the network traffic is taken by the network processor 107, based on the result of the DPI. Similarly, in some embodiments, the second network interface circuit 110 can comprise a plurality of network interfaces or ports, with data transfer between one or more network interfaces in the plurality of network interfaces. In such embodiments, the network processor 107 comprising the signature matching hardware accelerator system 108 is configured to receive the network traffic from one of the ports of the second network interface circuit 110 and perform DPI on the received network traffic, before forwarding the network traffic to a subsequent port within the second network interface circuit 110 or the first network interface circuit 106.

In some embodiments, the signature matching hardware accelerator system 108 can comprise one or more hardware accelerator circuits (not shown), each having a DFA comprising a state table representing a database of signatures associated therewith. In some embodiments, the one or more hardware accelerator circuits can comprise DFAs with the same signature set. In such embodiments, multiple data streams can be inspected in parallel, thereby greatly increasing the throughput of DPI. An example implementation of this scenario is given in FIG. 1c. FIG. 1c comprises a signature matching hardware accelerator system 160 comprising 4 hardware accelerator circuits 160a, 160b, 160c and 160d. Each of the hardware accelerator circuits 160a, 160b, 160c and 160d comprises 100 signatures storage capacity and 1 Gbps throughput capacity. In one scenario, if the target signature count is 100 and the target throughput is 4 Gbps, each of the 4 hardware accelerator circuits 160a, 160b, 160c and 160d can be configured to have the same signature set (or the same DFA) each having the target signature count of 100 and 4 data streams 162a, 162b, 162c and 162d can be inspected in parallel as shown in FIG. 1c. Therefore, in this embodiment, a throughput of 4 Gbps can be achieved.

Figure 1D:
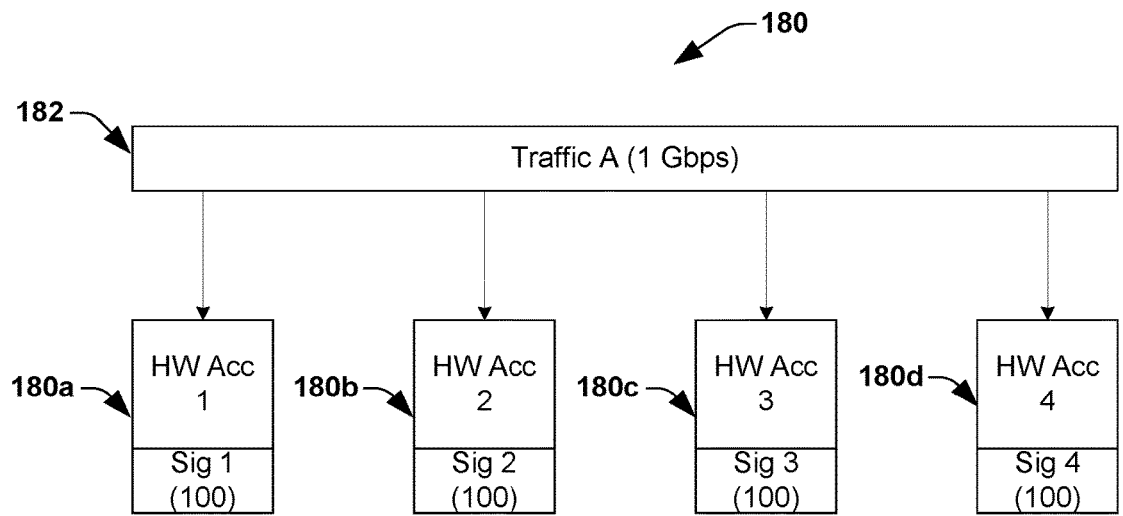
FIG. 1d comprises a signature matching hardware accelerator system comprising four hardware accelerator circuits, according to another embodiment of the disclosure.

Further, in other embodiments, the one or more hardware accelerator circuits can comprise DFAs with different signature sets. For example, in one instance, if due to some constraint the number of signatures in a signature set does not fit into one DFA (or a hardware accelerator circuit), then the signature set can split across multiple DFAs in multiple hardware accelerator circuits. An example implementation of this scenario is given in FIG. 1d. FIG. 1d comprises a signature matching hardware accelerator system 180 comprising 4 hardware accelerator circuits 180a, 180b, 180c and 180d. Each of the hardware accelerator circuits 180a, 180b, 180c and 180d comprises 100 signatures storage capacity and 1 Gbps throughput capacity. In one scenario, if the target signature count is 400 and the target throughput is 1 Gbps, the target signature count of 400 can be divided between the 4 hardware accelerator circuits 180a, 180b, 180c and 180d, each having a signature count of 100. In such embodiments, the DFA associated with each of the 4 hardware accelerator circuits 180a, 180b, 180c and 180d are different, each having 100 signatures out of the 400 signature target count. In order to inspect a data stream 182 across the target signature count of 400 and have a throughput of 1 Gbps, in this embodiment, the same data stream 182 can be inspected across all the 4 hardware accelerator circuits 180a, 180b, 180c and 180d as shown in FIG. 1d. In another instance, for example, when the numbers of signatures in a signature set are less than the storage capacity of a hardware accelerator circuit, multiple groups of signatures can be used across multiple hardware accelerator circuits. Depending on the application scenarios, other combinations of the signature count and throughput is contemplated and is within the scope of this disclosure.

In some embodiments, the one or more hardware accelerator circuits can be selectively activated or deactivated based on the system requirements. In some embodiments, the DFA comprises a state table defined by a plurality of states and a plurality of characters, each state having a plurality of next state transitions associated respectively with the plurality of characters. In some embodiments, matching an incoming traffic with a DFA comprises fetching a next state transition from the DFA table, based on the information of a current state of the DFA and a current input character. In some embodiments, the current input character is derived from the incoming traffic and comprises a character in a sequence of characters in the incoming traffic to be matched with the DFA. In some embodiments, a match is determined when the next state transition fetched from the DFA table corresponding to the current state and the current input character is an accepting state. Accepting states are a subset of states in a DFA, which once reached, identifies that a signature has been successfully matched. Each accepting state has a unique identification associated with it to make sure that post processing rules corresponding to the signature are promptly followed.

FIG. 1b depicts a hardware accelerator circuit 150 that facilitates deep packet inspection in distributed networks, according to one embodiment of the disclosure. In some embodiments, the hardware accelerator circuit 150 is included within the signature matching hardware accelerator system 108 of FIG. 1a. In some embodiments, the hardware accelerator circuit 150 is configured to store a database of signatures and compare an incoming network data with the database of signatures in order to find, identify, classify, reroute or block data packets with specific data or code. In some embodiments, the hardware accelerator circuit 150 is configured to match the incoming network traffic (e.g., transport layer data) with a deterministic finite automata (DFA) comprising a state table representing the database of signatures. The hardware accelerator circuit 150 comprises a processing circuit 152 and a memory circuit 154. In some embodiments, the hardware accelerator circuit 150 is configured to operate in two phases: a compression phase and a fetch phase.

In the compression phase, the processing circuit 152 is configured to compress an original DFA table comprising a plurality of next state transitions is compressed to form the compressed DFA table. In some embodiments, the number of next state transitions in the compressed DFA table is less than the number of next state transitions in the original DFA table. In some embodiments, the original DFA table is compressed to form the compressed DFA table in order to reduce the memory requirement of the DFA and to enable an efficient lookup of the DFA table during deep packet inspection (DPI). In some embodiments, the original DFA table is compressed to form the compressed DFA table, also referred to as a compressed state table, based on a predetermined compression technique, which is explained in detail in subsequent embodiment(s) described below. The memory circuit 154 is coupled to the processing circuit 152 and is configured to store the compressed DFA from the processing circuit 152. In some embodiments, the memory circuit can comprise a plurality of lookup tables configured to store the information related to the compressed DFA. In some embodiments, the compression phase is performed within the processing circuit 152 prior to the fetch phase. However, in other embodiments, the compression phase can be performed by a compression processing circuit (not shown) external to the hardware accelerator circuit 150 and stored in the memory circuit 154 prior to the fetch phase. In some embodiments, the compression processing circuit can be part of the network processor 107 in FIG. 1a, while in other embodiments, the compression processing circuit can be a separate chip external to the network processor 107.

In the fetch phase, the processing circuit 152 is configured to receive a current state and a current input character, and fetch the next state transition corresponding to the current state and the current input character from the compressed DFA stored in the memory circuit 154. In some embodiments, the next state transition for the current state is fetched by fetching information from one or more lookup tables in the memory circuit 154, in accordance with a predetermined algorithm, explained in detail in a subsequent embodiment below. In some embodiments, the fetch phase enables the signature matching system 150 to compare an incoming network data with the database of signatures to perform deep packet inspection.

FIGS. 2-6C depict a compression technique based on bitmaps for a deterministic finite automata (DFA), according to one embodiment of the disclosure. In some embodiments, the compression technique discussed herein, can be utilized to determine the compressed DFA as indicated above with respect to FIG. 1b. In some embodiments, the compression technique discussed herein is performed within the processing circuit 152 in FIG. 1b and the compressed DFA is stored within the memory circuit 154 in FIG. 1b. However, in other embodiments, the compression technique is performed by a compression processing circuit external to the hardware accelerator circuit 150 in FIG. 1b and stored in the memory circuit 154 prior to the fetch phase.

The compression technique involves a dimensional compression algorithm that generates a compressed DFA. The compressed DFA is then stored in a memory, such as the memory circuit 154. The compression technique includes a first part or process to compress state transitions and a second part or process that groups states to facilitate compression and reduce transitions within groups or sets. The groups or sets are again compressed based on redundant transitions. The redundant transitions are compressed and a resulting automata is stored in a memory, such as the memory circuit 154. The resulting automata can be used for DPI and other packet inspection methodologies. The grouping of the states to facilitate compression involves determining sets and subsets of states having similar transitions.

Figure 2:
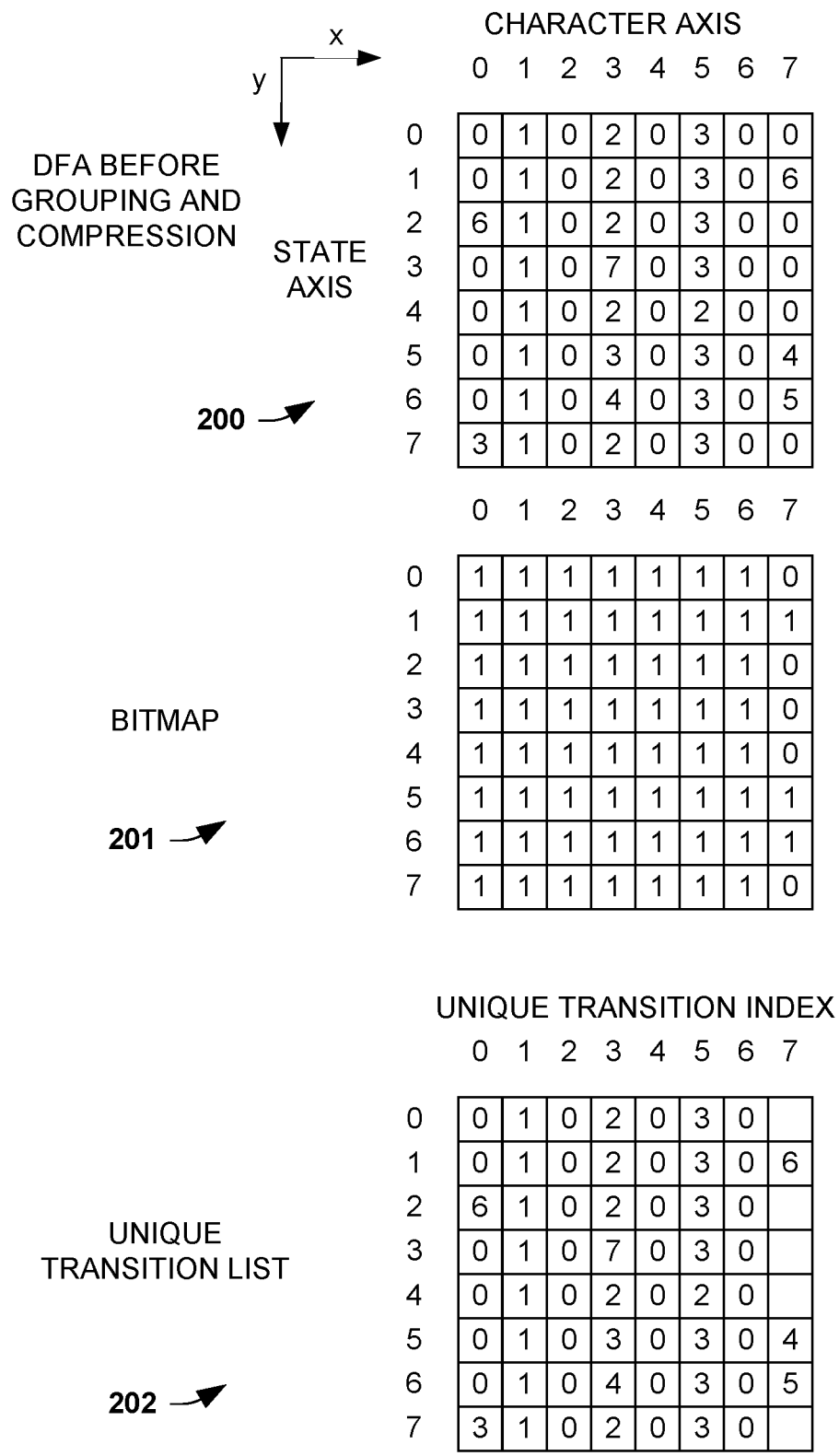
FIG. 2 is a diagram illustrating an exemplary bitmapping process of creating a bitmap in accordance with one embodiment of the disclosure.

FIG. 2 is a diagram illustrating horizontal compression of an example DFA table. The example DFA is provided for illustrative purposes and it is appreciated that suitable variations are contemplated. FIG. 2 includes a DFA table 200 uncompressed and prior to compression, a generated DFA bitmap 201, and a unique transition list 202.

The DFA 200 is shown uncompressed. The DFA table 200 is 8×8 with 8 states and 8 characters. The states have identifications (IDs) of 0 to 7 along an x-axis, also referred to as a character axis. The characters have IDs of 0 to 7 in a y-axis, also referred to as a state axis. If the DFA 200 is stored in memory, 64 transitions are to be stored in memory.

In order to reduce storage requirements for the DFA, a horizontal compression is performed along the x-axis. A bitmap is created for each state in the table 200. If a state transition for a character is the same as the state transition to a previous character (to the left), a bitmap for the character is set to '0'. The state transition corresponding to that character is compressed and not stored in memory. If the state transition for the character is different from the state transition to the previous character, a bitmap for the character is set to '1', the state transition corresponding to the character is added to a unique state transition list and is stored in memory.

The generated bitmap for the table 200 is shown at the generated DFA bitmap 201. The number of entries in the unique transition list depends on the number of '1's in the DFA bitmap 201. For example, the bitmap corresponding to state 0 has seven '1's in the bitmap, which means that there are seven transitions in the unique transition list after the bitmap has been generated. Thus, 1 of the 8 transitions for the state 0 has been compressed. The bitmap corresponding to state 6 has eight '1's in the bitmap, which means that there are eight transitions in the unique transition list after the bitmap has been generated and no transitions have been compressed.

The generated unique transition list for the bitmap 201 and the DFA table 200 is shown as the unique transition list 202. In this example, 5 transitions of the 64 are compressed.

It is appreciated that varied amounts of compression can be obtained using the described horizontal compression. In one example, about fifty percent compression is obtained.

Figure 3:
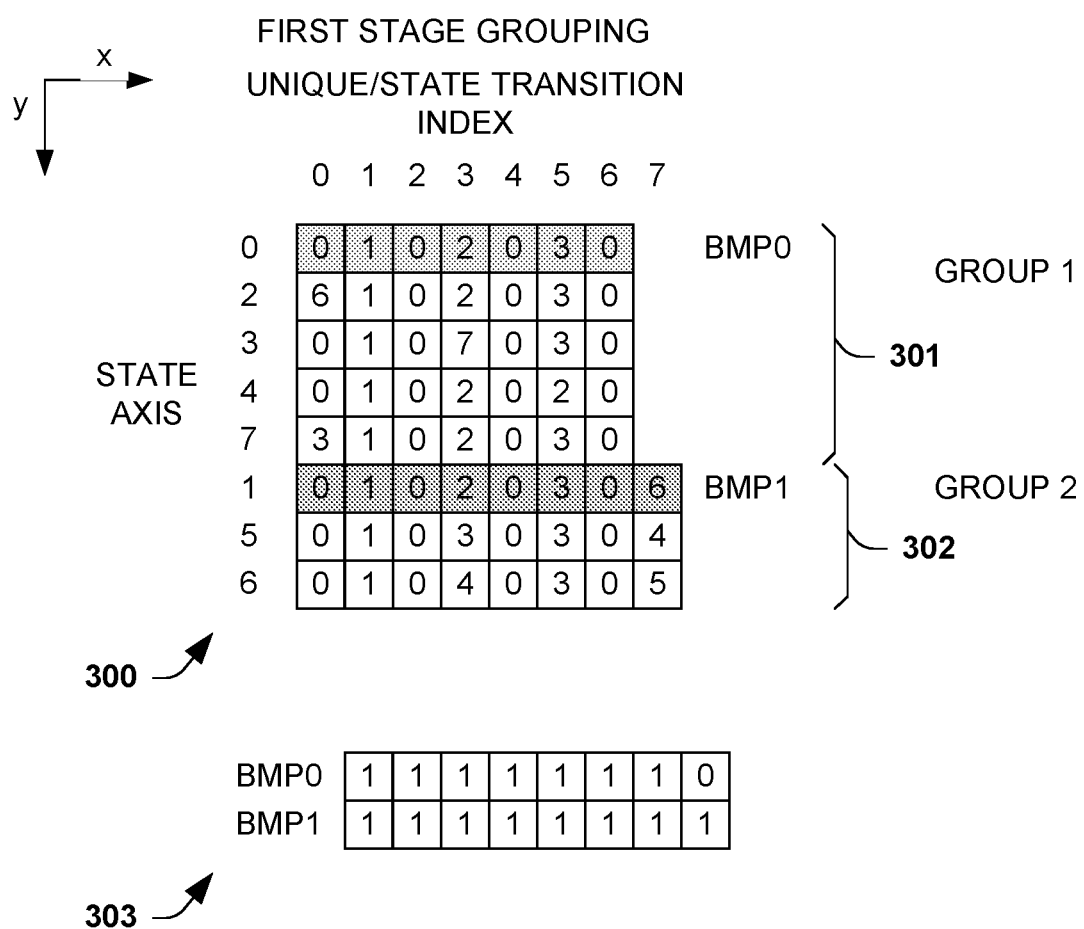
FIG. 3 depicts a compressed DFA table after bitmapping comprising a state table representing a database of digital signatures and illustrating first stage grouping.

FIG. 3 depicts a compressed DFA table 300 after bitmapping a state table representing a database of digital signatures and illustrating first stage grouping. The DFA table 300 is shown depicting first stage grouping, which is performed after the horizontal compression shown in FIG. 2. It is appreciated that the values and sizes shown are for illustrative purposes and that other numbers of states, characters, sizes and values are contemplated.

The states of the table 300 are grouped according to criteria so that similar states are grouped together. The grouping criteria includes grouping states in a set that have the same bitmap and grouping states in a set that have at least a threshold percentage of transitions which are similar to each other. The grouping based on the bitmap is referred to as first stage grouping and the grouping based on the threshold percentage is referred to as second stage grouping. The threshold percentage is also referred to a transition threshold. Examples of the threshold percentage include 85 percent, 75 percent, 50 percent and the like.

It is appreciated that the grouping criteria can include other information instead of and/or in addition to the bitmap based grouping. For example, the grouping criteria can include the number of states per group and the like.

The table 300 is defined by a plurality of states along a state axis (y-axis) and a plurality of characters along a character axis (x-axis). Each of the plurality of states comprises a plurality of next state transitions corresponding to a plurality of characters. The character axis is also referred to as a unique transition index, after horizontal compression.

The generated bitmap is shown above with regard to the DFA bitmap 201, described above. The bitmap 201, in this example, shows two bitmaps, BMP0 and BMP1, which are also shown as 303 in FIG. 3. The compressed states of the table are grouped into sets 301 and 302. The set 301 includes states that correspond to the bitmap BMP0 and the set 302 includes states that correspond to the bitmap BMP1. The sets 301 and 302 are sets derived after the first stage grouping, which is grouping based on bitmaps of the states of the DFA table.

It is noted that the index along the character axis or x-axis for the table 300 is not the same as the index shown in 200 of FIG. 2. There are only 7 transitions per state after horizontal compression for the set 301 corresponding to BMP0 whereas there are 8 transitions per state after horizontal compression for the set 302 corresponding to BMP1. The index varies for each set.

Figure 4:
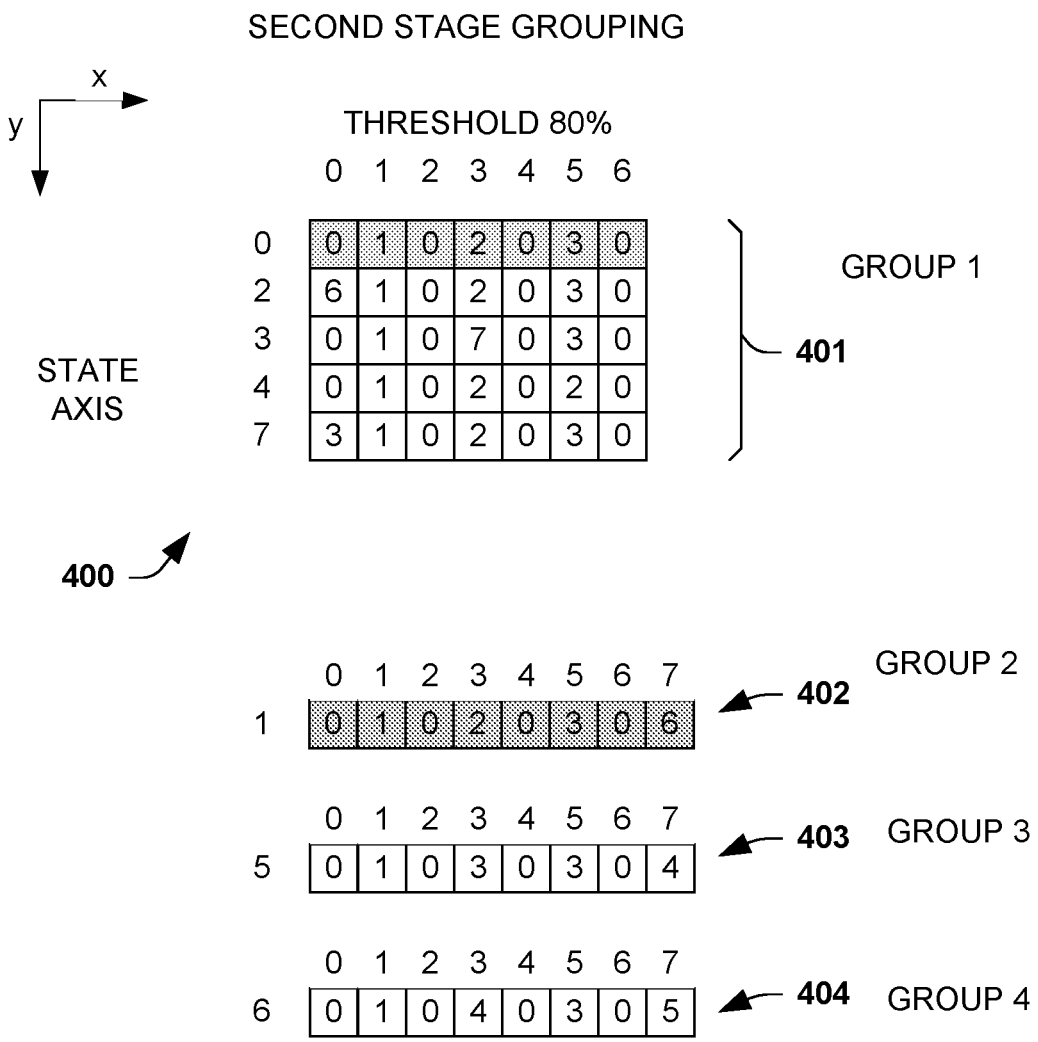
FIG. 4 depicts a horizontally compressed DFA table comprising a state table representing a database of digital signatures and illustrating second stage grouping.

FIG. 4 depicts a horizontally compressed DFA table 400 comprising a state table representing a database of digital signatures and illustrating second stage grouping. The second stage grouping is performed after the first stage grouping. It is appreciated that the values and sizes shown are for illustrative purposes and that other numbers of states, characters, sizes and values are contemplated.

As stated above, the second stage grouping is a grouping where states are regrouped into sets that have a percentage of transitions similar to each other. In this example, the threshold percentage is set to 80 percent. The process of the second stage grouping is also referred to as a similarity check. The process is performed after the first stage grouping has generated sets or groups of states.

To perform the similarity check, one of the states in a set is designated as a leader state or reference state. Transitions at each index of the unique transition list is compared to obtain a percentage of similarity. If the percentage of similarity is at or above the transition threshold, the state remains in the set. If the percentage of similarity is below the transition threshold, the state is placed in another set or a new set is created with the state. For example, state 0 is taken as the reference state in group 1.

When the transitions of state 0 and state 2 are compared at each index, 6 out of 7 transitions are exactly the same across the indices resulting in 85% transition threshold. So in this case, state 2 is retained in group 1.

As shown above, states 1, 5 and 6 belong to set 2 after the first stage grouping. Using state 1 as the leader state, states 5 and 6 have obtained percentages of similarity of 75 percent. As a result, states 5 and 6 are placed in new sets or groups. Thus, state 1 remains in set 402, state 5 is placed in set 403 and state 6 is placed in set 404.

Each set has a leader or reference state and can have 1 or more member states. Set 401 includes states 0, 2, 3, 4, and 7. State 0 is the leader state and states 2, 3, 4 and 7 are member states. Set 402 has state 1 as the leader state and no member states. Set 403 has state 5 as the leader state and no member states. Set 404 has state 6 as the leader state and no member states.

Vertical compression is performed in the vertical direction (y-axis) between the leader state and member states. For example, the leader state for set 401 is state 0. Member states 3 and 4 at unique transition index 0 have the same transitions as the leader state. Member states 2 and 7 have different transitions at unique transition index 0. Thus, the state transitions corresponding to the unique transition index 0, for states 3 and 4 are not stored in memory while the state transitions corresponding to states 2 and 7 are stored in memory.

Figure 5A:
FIG. 5A illustrates a unique transition list after horizontal and vertical compression.

FIG. 5A illustrates a unique transition list 500 after horizontal and vertical compression. The list 500 shows transitions that are stored and, as a result, transitions that are compressed. The transitions are shown for illustrative purposes and it is appreciated that other values and sizes can be utilized.

The unique transition list 500 is based on the DFA table 200 shown above. Horizontal and vertical compression has been performed along with first and second stage grouping.

The list 500 shows the states grouped in four sets as described in FIG. 4. The unique transitions for each state are stored in memory after compression.

Figure 5B:
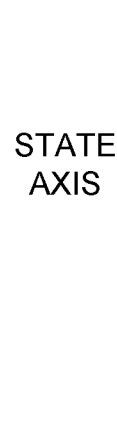
FIG. 5B illustrates generated bitmasks for sets subsequent to grouping.

FIG. 5B illustrates generated bitmasks 501 for sets subsequent to grouping.

The bitmasks correspond to the states as grouped in four sets as described above.

The similarity in transitions between the leader state and a member state at a specific index in a unique transition list is captured by creating a bitmask for every member state. The bitmask corresponding to unique transition index 0 for member states 2 and 7 are set to '1' as the state transition is different from the transition corresponding to the leader state at the index. The bitmask corresponding to index 0 for member states 3 and 4 are set to '0' as the transition are same from the transition corresponding to the leader state at the index. The '1' indicates that the transition is stored while the '0' indicates that the transition is not stored or compressed. The bitmask and transition comparisons are done for all member states and for all sets or groups.

For the vertical compression, the bitmask is generated for member states, not the leader state. Thus, the bitmask corresponding to the leader state is shown as '–'. The bitmask for the leader state is shown for illustrative purposes and will not be stored in memory.

Subsequent to the horizontal and vertical compression process, 35 transitions are stored in memory as compared to 64 in the original DFA table 200. The bitmap and bitmasks can be used to determine if a transition corresponding to an incoming character is compressed or uncompressed. The horizontal and vertical compression algorithm is defined as the 2 dimensional state transition compression algorithm.

The number of uncompressed transitions for each set is the sum of total number of uncompressed transitions in the leader state after horizontal compression and total number of uncompressed transitions resulting from vertical compression.

However, it is noted that the resulting compression results in 7 leader transitions and 4 member transitions being stored in memory in case of group 1. Groups 2, 3 and 4 have only a leader state and no member state. Thus, these three groups have 8 transitions which are uncompressed and stored in memory. The total number of uncompressed transitions or the transitions stored in memory for group 1 is 11 while it is 8 in case of groups 2, 3 and 4.

The total number of uncompressed transitions for each set is the sum of total number of uncompressed transitions in the leader state after horizontal compression and total number of uncompressed transitions resulting from vertical compression. For example with regards to the group 1 in 501, state 0 is set as the leader state and states 2, 3, 4 and 7 are member states. The leader state has 7 uncompressed transitions corresponding to indices 0 to 6. The member states 2,3,4 and 7 each have 1 uncompressed transition at index 0, 3, 5 and 0 respectively which makes a total of 11 uncompressed transitions for group 1.

To further improve compression, an additional grouping can be performed subsequent the second stage grouping and prior to the vertical compression. The additional grouping is referred to as a conquer grouping or conquer step.

The conquer step begins subsequent to the second stage grouping and further facilitates vertical compression. The conquer step combines sets together under certain specific criteria and reduces the number of uncompressed transitions generated after vertical compression.

The criteria for combining sets or groups for the conquer step is referred to as conquer criteria. The conquer criteria includes that two sets can be combined into a single set if both sets have the same bitmap after horizontal compression and that the two sets can be combined into a single set if the number of uncompressed transitions generated after vertical compression for the combined set is less than the number of uncompressed transitions when the sets are not combined.

The conquer step is performed using the conquer criteria on all sets or groups. For example, if there are M groups after the second stage grouping, each set is checked with M−1 sets. The combination of sets is identified that results in the lowest or lower number of uncompressed transitions. The identified combination of sets is used for vertical compression.

Thus, if a combination is identified for a set when compared with the M−1 sets, the two sets are combined together. When two sets A and B are combined, all states of a B set are added to an A set. The number of sets M gets reduced by 1 when 2 sets of states are combined together. The process is performed iteratively until sets of states cannot be combined anymore. The conquer step yields a more compressible combination of sets that will generate the least number or less uncompressed transitions to be stored in memory.

As a result, a two dimensioned compressed state table is generated and can be used as a compressed DFA.

Figure 6A:
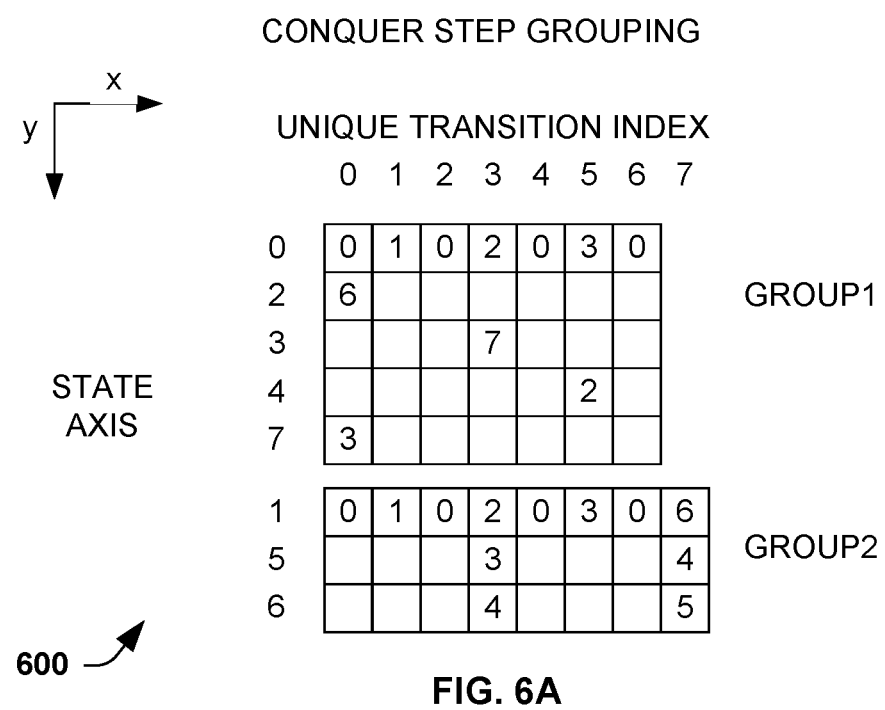

FIGS. 6A, 6B and 6C provide an example of grouping states based on a conquer step or conquer step grouping. The shown groupings are illustrative only and it is appreciated that suitable variations are contemplated.

FIG. 6A depicts an example of an grouping 600 of states using the conquer step grouping. The shown groupings are for illustrative purposes and it is appreciated that suitable variations are contemplated.

Prior to the conquer step grouping, the states are arranged as shown in FIG. 5A with four sets, a first set having states 0, 2, 3, 4 and 7, a second set having only state 1, a third set having only state 5, and a third set having only state 6.

The grouping includes a first set/group, GROUP 1 and a second set/group, GROUP 2. The first set includes states 0, 2, 3, 4, and 7. The second set includes states 1, 5 and 6. The grouping reduces the number of uncompressed transitions and the number of sets. It can be clearly seen that after the conquer step, group 1 has 11 uncompressed transitions and group 2 has 12 uncompressed transitions. This is about 12 transitions lesser than the uncompressed transitions after the second stage grouping.

FIG. 6B depicts an example grouping 601 of states at a first iteration of a conquer step grouping. The shown groupings are for illustrative purposes and it is appreciated that suitable variations are contemplated.

A first iteration of the conquer step grouping determines that the number of uncompressed transitions is reduced by combining the state 1 with the state 5. The combination of states 1 and 5 is referred to as set or GROUP2. If the number of transitions was not reduced by combining, the state 5 would be in a different set. The state 6 remains in its own set, referred to as GROUP3.

FIG. 6C depicts an example grouping 602 of states at a second iteration of a conquer step grouping. The shown groupings are for illustrative purposes and it is appreciated that suitable variations are contemplated.

State 1 remains as the leader state. A second iteration of the conquer step grouping determines that the number of uncompressed transitions is reduced by combining the state 6 with the set GROUP2. If the number of transitions was not reduced by combining, the state 6 would remain in its own set. As a result, the number of sets is reduced from 3 to 2 and the number of uncompressed transitions is reduced.

FIG. 7 is an example of suitable pseudocode 700 for a conquer step in accordance with an embodiment. The example 700 is provided for illustrative purposes and it is appreciated that suitable variations are contemplated. The example 700 illustrates a suitable technique to combine sets or groups of states after the second stage grouping and facilitate compression. In general, the example grouping of states typically improves compression by reducing or mitigating leader state transitions and/or member state transitions. Combining groups generally results in less sets or groups of states. This results in a lesser number of leader transitions after vertical compression. The pseudocode 700 can be performed by a compression processing circuit, which can be part of the network processor 107.

The example 700 tries various combinations of states to form sets that are more compressible a previous grouping. The pseudocode example includes portions 701, 702, 703 and 704. The portion 701 calculates a total number of transitions stored in memory for each set or group of states after a compression algorithm, such as the 2 dimensional state transition compression algorithm discussed before. This calculated number of transitions is taken as the reference for the number of transitions stored in each group before performing the conquer step.

Considering one of the sets or groups "i" among M sets or groups of states, the criteria to combine the group with any set or group of states "j" is analyzed in portion 702. As this is an iterative step, the best combination of sets or groups of states which can be combined is identified.

The portion 703 checks if a best combination of states is identified after executing portion 702. If a best combination is identified, the corresponding set or group of states is combined together and the conquer step continues with M−1 states further. If after the execution of 702 and 703 on all the sets or groups doesn't result in any reduction in the number of groups, the conquer step ends as shown in step 704.

Generally, member state transitions can be reduced by choosing the leader in a set, which has a higher number of similar transitions at an index position, when compared with all other members in the state. Of all the states in the set, each state is chosen as the leader and the number of member transitions that need to be stored among the other states in the set is calculated using the 2 dimensional state transition compression algorithm. The state that stores or requires the least number of member transitions is eventually chosen or selected as the leader state for the state set.

FIG. 8 is an example of suitable pseudocode 800 to identify a leader state from states or member states of a set. The example 800 is provided for illustrative purposes and it is appreciated that suitable variations are contemplated.

The pseudocode 800 includes an initialization portion 804 that sets initial values for a leader state and the corresponding member transition generated with the current leader state. By default the first state in the group is always used as the leader state in the 2 dimensional state transition compression algorithm. Then, a loop portion 805 determines member transitions after compression for all other states in the set or group. If the member transitions are less than the number of transitions calculated in portion 805 with a state as the leader state, it is taken note that the state with which the iteration is run is the suitable candidate for the leader state. Portion 805 will identify the best leader state, also referred to as an enhanced leader state, after iterating through all the states in the set or group of states. The pseudocode 800 can be performed by a compression processing circuit, which can be part of the network processor 107.

The loop determines a leader state having leader state transitions that have the least number of member state transitions in that group.

Figure 9:
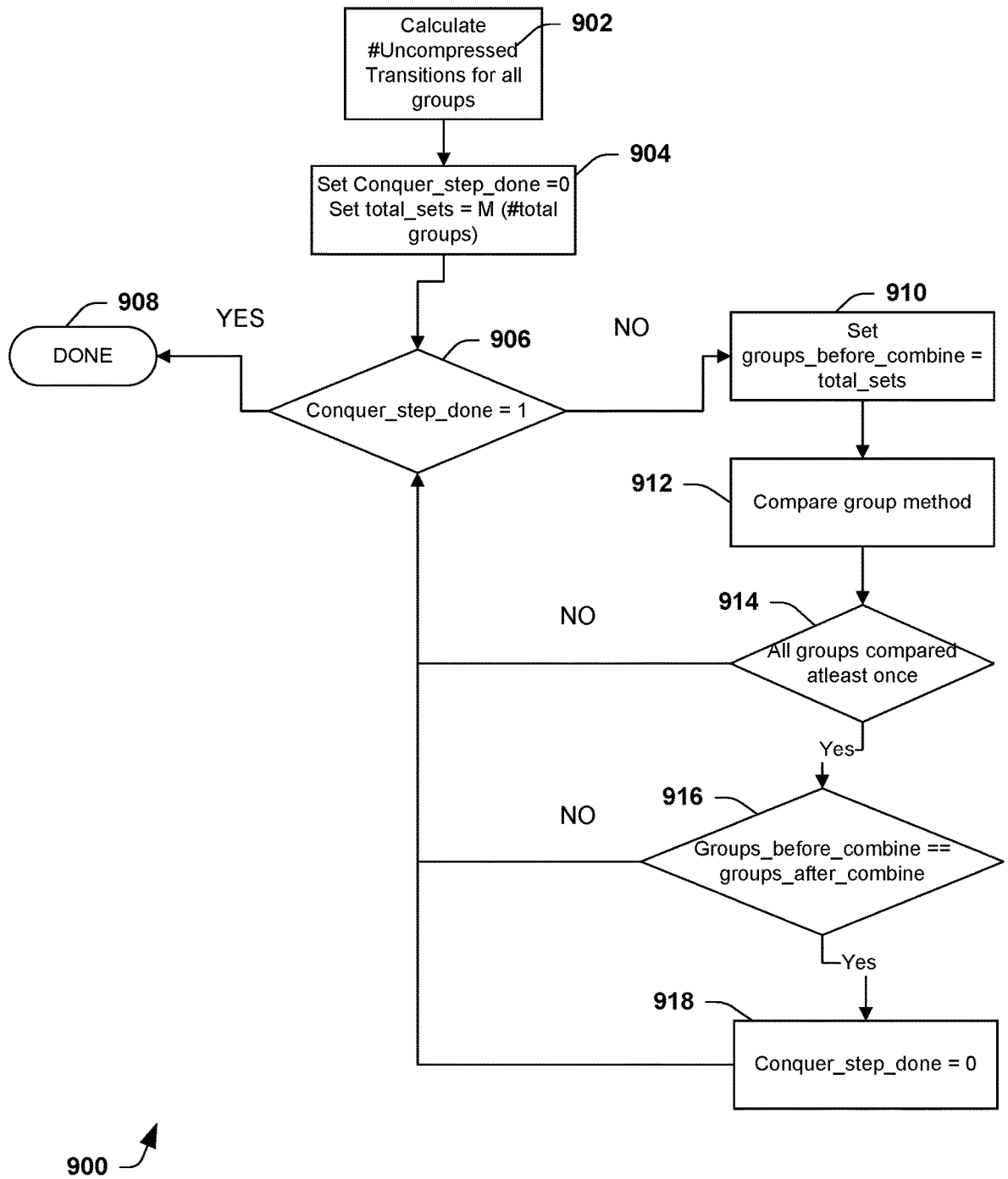
FIG. 9 is a flow diagram illustrating a method to group states under certain criteria that facilitates compression of a deterministic finite automaton (DFA) to form a compressed DFA, according to one embodiment of the disclosure.

FIG. 9 is a flow diagram illustrating a method 900 that facilitates compression of a deterministic finite automaton (DFA) to form a compressed DFA, according to one embodiment of the disclosure. The method 900 is described herein with reference to the hardware accelerator circuit 150 in FIG. 1b, the method 900 can be performed in a processing circuit external to the hardware accelerator circuit 150 in FIG. 1b or external to the network processor 107 in FIG. 1a. In some embodiments, the method 900 can be implemented in a processing circuit external to the distributed network system 100 in FIG. 1a and the resultant compressed DFA is stored in a memory circuit within the network processor 107 in FIG. 1a.

The method 900 assumes that first and second stage grouping has been performed to organize a plurality of states into sets or groups as shown above. The method 900 generates groupings based on the conquer step criteria. The method 900 is described at a high level for illustrative purposes. The pseudocode 900 can be performed by a compression processing circuit, which can be part of the network processor 107.

The method 900 begins at 902 where a number of uncompressed transitions for all sets or groups is determined after the 2 dimensional state transition compression algorithm is run.

Values are initialized at block 904. A flag indicating whether a conquer step is done is set to '0' or not done. Additionally, M is set to a total number of sets or groups of states generated after the second stage grouping, such as 3.

A check is made at block 906 as to whether the conquer step is done. If the corresponding flag is set to '1', the conquer step is done and the method 900 proceeds to block 908.

A value for groups before combine is set to M or the total number of sets during that iteration or group of states at block 910.

Each set is compared with the other sets to check if they can be combined at block 912.

A check is performed at block 914 to see if all sets have been compared at least once. If NO, the method 900 proceeds to block 906. If Yes, a check is made whether the number of groups before combine is equal to the number of groups after combining at block 916. If NO, the method 900 proceeds to block 906. If Yes, the conquer step done is set to '1' at block 918 and the method 900 proceeds to block 906.

Once the conquer step is done, revised sets of states can be provided at block 908. The revised sets of states mitigate the number of uncompressed transitions and facilitates compression.

Figure 10A:
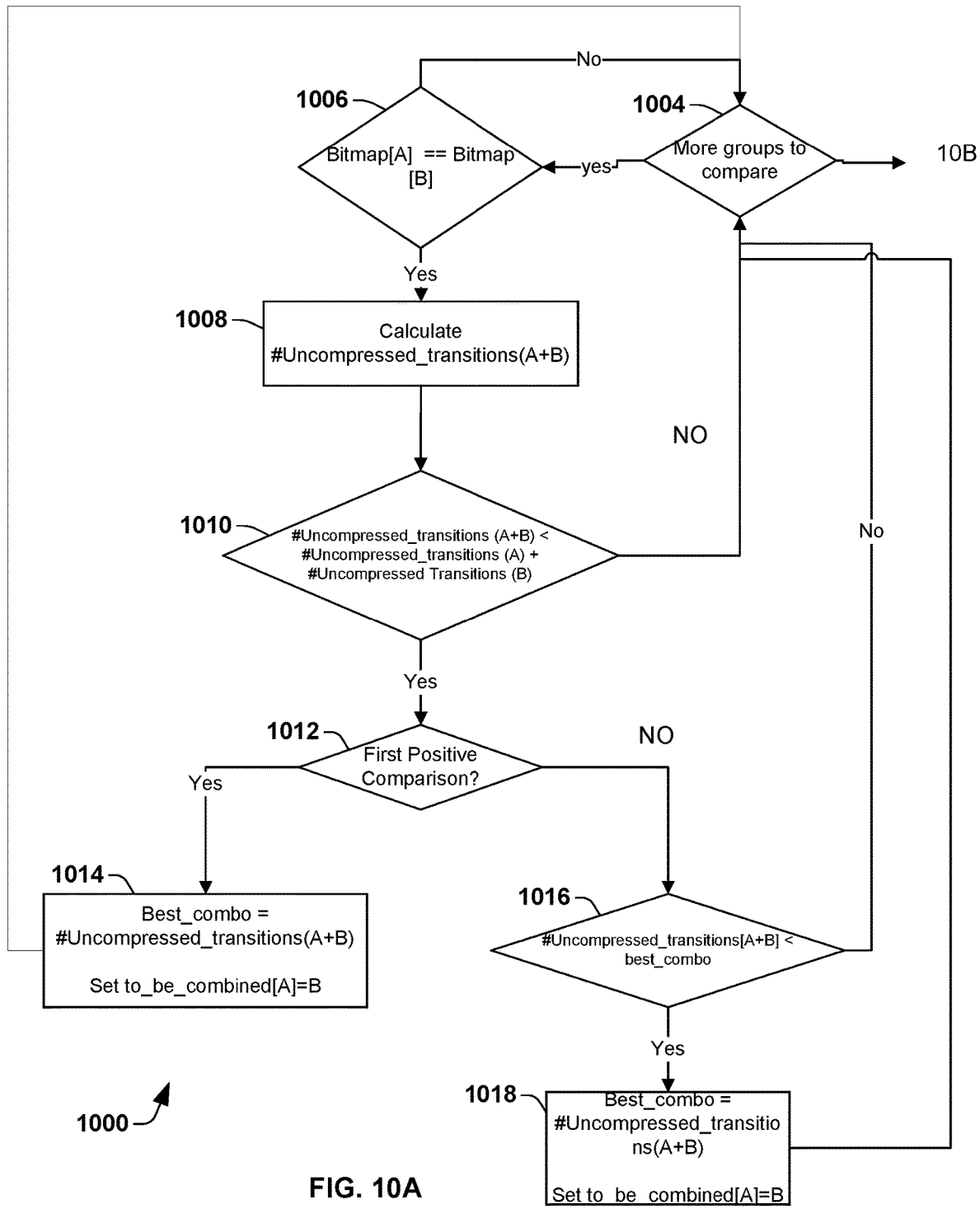
FIGS. 10A and 10B provide a flow diagram illustrating a method to combine states to form a set of states under certain criteria and to facilitate compression of a deterministic finite automaton (DFA) to form a compressed DFA, according to one embodiment of the disclosure.
Figure 10B:
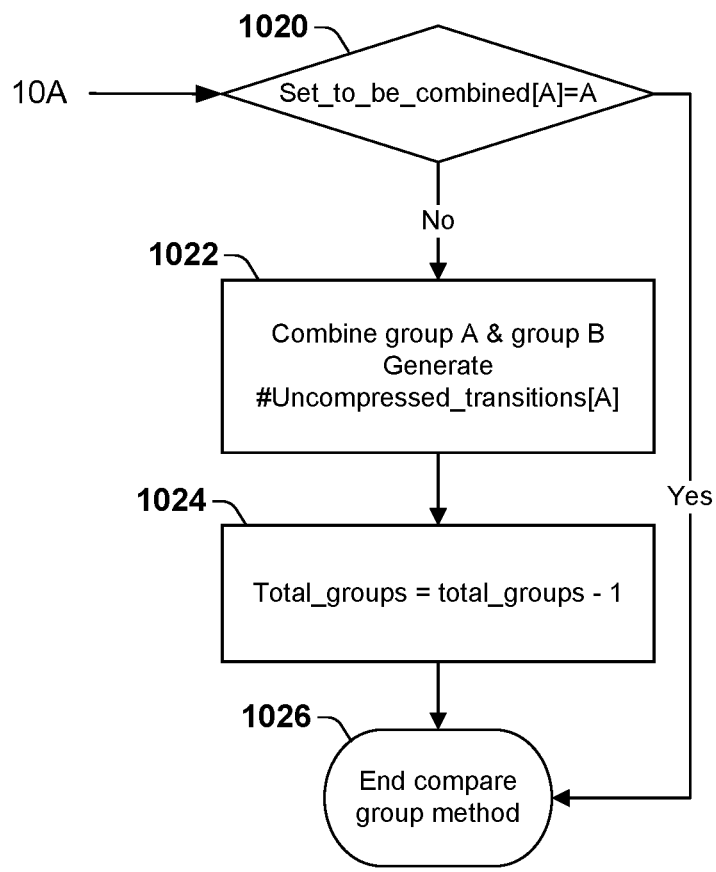

FIGS. 10A and 10B provide a flow diagram illustrating a method 1000 to facilitate compression of a deterministic finite automaton (DFA) to form a compressed DFA, according to one embodiment of the disclosure. The method 1000 is described herein with reference to the hardware accelerator circuit 150 in FIG. 1b. However, in other embodiments, the method 1000 can be performed in a processing circuit external to the hardware accelerator circuit 150 in FIG. 1b or external to the network processor 107 in FIG. 1a. In some embodiments, the method 1000 can be implemented in a processing circuit external to the distributed network system 100 in FIG. 1a and the resultant compressed DFA is stored in a memory circuit within the network processor 107 in FIG. 1a.

The method 1000 assumes that first and second stage grouping has been performed to organize a plurality of states into sets or groups as shown above. The method 1000 generates resides groupings based on the conquer step criteria. The method 1000 describes the method 912 in detail explaining how a set of states or group is combined with another. The method 1000 can be performed by a compression processing circuit, which can be part of the network processor 107.

A check is made at block 1004 whether there are more groups to compare. If NO, the method 1000 proceeds to block 1020 of FIG. 10B. If yes, a check is made at block 1006 whether a bitmap for a current set, referred to as set A, is equal to a bitmap for another set, set B. If NO, the method 1000 proceeds to block 1004. If Yes, the method proceeds to block 1008.

The number of uncompressed transitions for a combined set based on sets A and B is calculated at block 1008. The combined set includes states from both the set A and the set B. Thus, the sets A and B are temporarily combined into a combined set. The leader state for the set A is used to calculate the number of uncompressed transitions for the combined set.

A check is made at block 1010 whether the number of uncompressed transitions for the combined set is less than a sum of the number of uncompressed transitions for the set A and the set B. If the number of uncompressed transitions is less, the method 1000 proceeds to 1012. Otherwise, the method 1000 proceeds to block 1004.

At block 1012, a check is made whether the comparison at block 1010 is a first positive comparison. If yes, the combined set is set as a best combination at block 1014 and the method 1000 proceeds to block 1004. Otherwise, a check is made whether the number of uncompressed transitions for the combination is less than a best combination identified previously, at block 1016. If yes, the combination of set A and B is set as the best combination and the method 1000 proceeds to block 1004. Otherwise, the method 1000 proceeds to block 1004 without updating the best combination.

If there are no more sets/groups to compare at block 1004, the method 1000 proceeds to block 1020. The best set or group of states to be combined for a set A is set to A initially and during the compare group method this gets updated if a set or group A can be combined with another group, say group B. A check is performed if the set to be combined with group A is still group A, which represents that the set of states cannot be combined with another set of states B. If Yes, the method 1000 proceeds to block 1026, where processing for the set is ended or completed. If NO, the method 1000 proceeds to block 1022 where set A and set B are combined and uncompressed transitions for the combined set are generated. At block 1024, the total number of groups/sets to process is reduced by 1 and the method 1000 proceeds to block 1026.

It is appreciated that understanding of the methods 900 and 1000 can be facilitated by referencing the pseudocode shown in FIG. 7.

Figure 11:
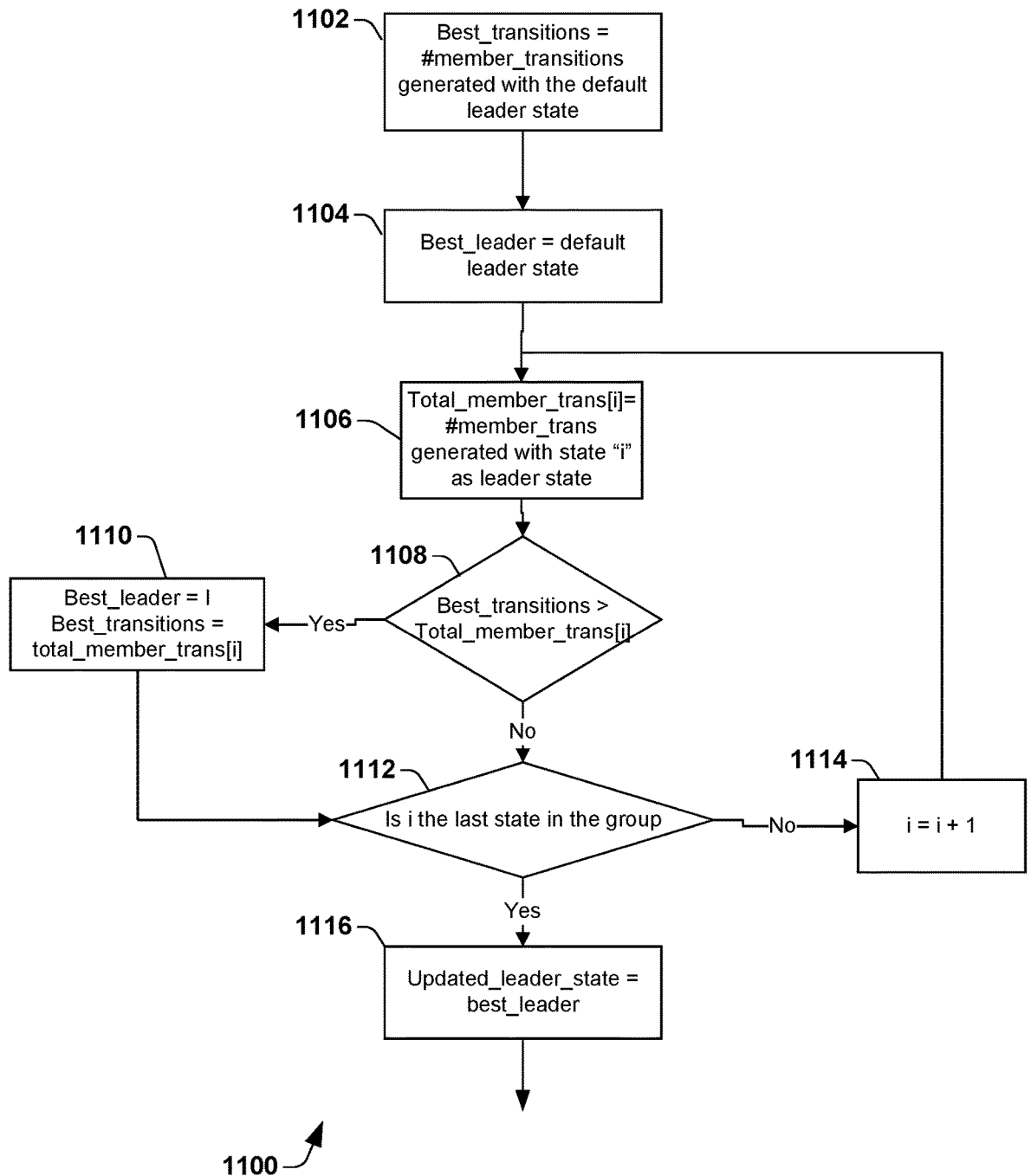
FIG. 11 is a flow diagram illustrating a method to choose the best leader state in a set of states to facilitate compression of a deterministic finite automaton (DFA) to form a compressed DFA, according to one embodiment of the disclosure.

FIG. 11 is a flow diagram illustrating a method 1100 to facilitate compression of a deterministic finite automaton (DFA) to form a compressed DFA, according to one embodiment of the disclosure. The method 1100 is described herein with reference to the hardware accelerator circuit 150 in FIG. 1*b*. However, in other embodiments, the method 1100 can be performed in a processing circuit external to the hardware accelerator circuit 150 in FIG. 1*b* or external to the network processor 107 in FIG. 1*a*. In some embodiments, the method 1100 can be implemented in a processing circuit external to the distributed network system 100 in FIG. 1*a* and the resultant compressed DFA is stored in a memory circuit within the network processor 107 in FIG. 1*a*.

The method 1100 is utilized to identify the best leader or reference state for a set. For example, the method 1100 can be utilized with block 1014 of the method 1000 or independently. The method 1100 identifies a leader state for a set of states that results in a least number of uncompressed transitions for the set. The method 1100 can be performed by a compression processing circuit, which can be part of the network processor 107.

The method 1100 begins at block 1102 where a value for best transitions, which is the number of member transitions generated with the default leader state in the set.

The initial state is set as the best leader state at block 1104.

Instead of the default leader state, state "i" in the group is made or selected as the leader state and the corresponding member transitions resulting after the 2 dimensional state transition compression algorithm is calculated in block 1106. The term i ranges from an initial value of 0 to a number m−1, where there are m states in the set/group.

A check is made at block 1108 whether the best transitions is greater than the calculated member transitions for the state i. If the best transitions is greater, the method 1100 proceeds to block 1110, where the best leader state assigned as the state "i" and best transitions is set to the calculated member transitions with state "i" as the leader state. Otherwise, a check is made at block 1112 whether state i is the last state in the set/group. If state i is the last state, the leader state is set to the best state at block 1116. Otherwise, i is incremented at block 1114 and method proceeds to block 1106.

Understanding of the method 1100 is facilitated by referencing the pseudocode shown in FIG. 8.

Figure 12:
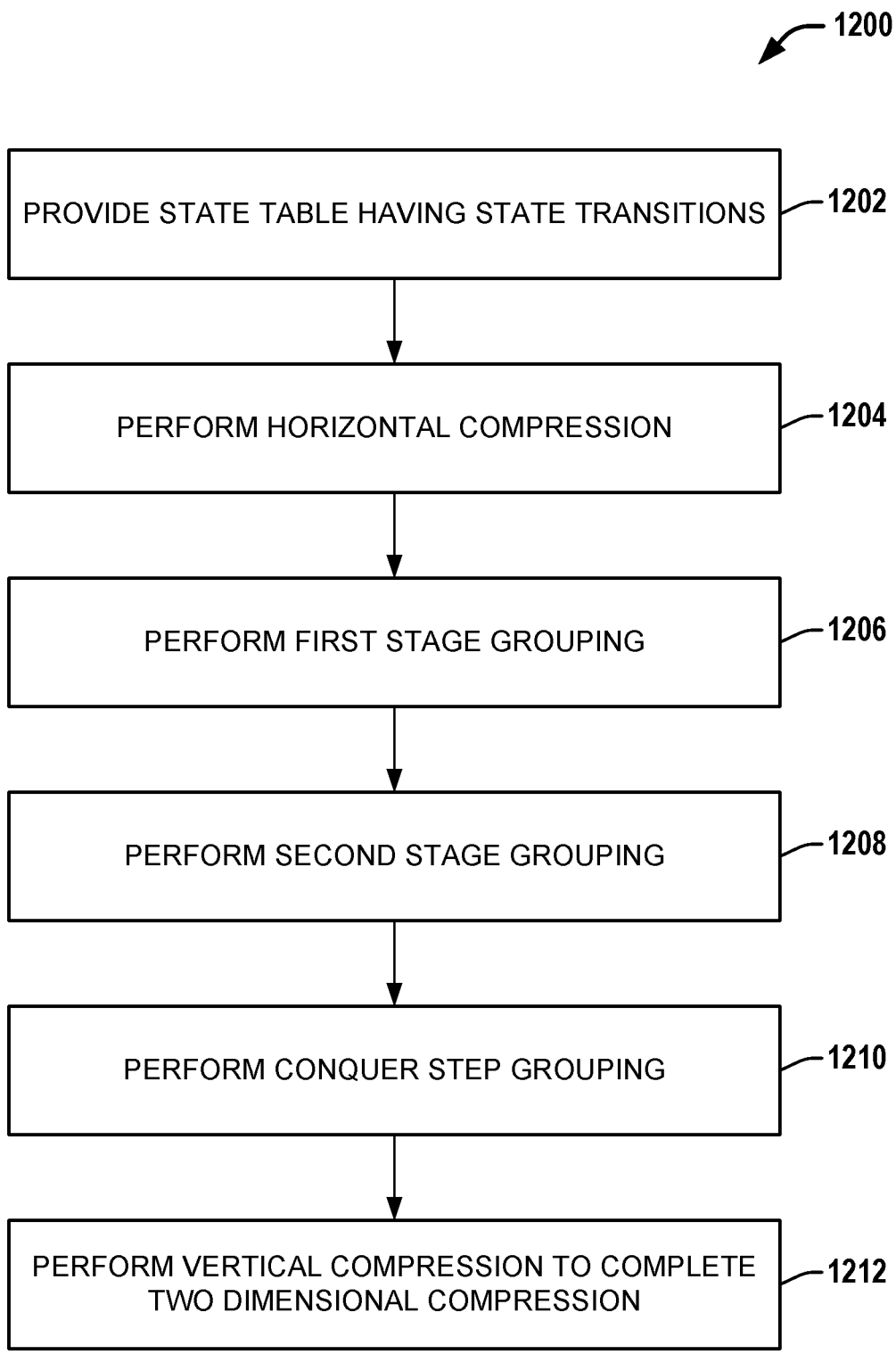
FIG. 12 illustrates a flow diagram of a method for compression of a deterministic finite automaton (DFA) to form a compressed DFA, according to one embodiment of the disclosure.

FIG. 12 illustrates a flow diagram of a method 1200 for compression of a deterministic finite automaton (DFA) to form a compressed DFA, according to one embodiment of the disclosure. The method 1200 is described herein with reference to the hardware accelerator circuit 150 in FIG. 1*b*. However, in other embodiments, the method 1200 can be performed in a processing circuit external to the hardware accelerator circuit 150 in FIG. 1*b* or external to the network processor 107 in FIG. 1*a*. In some embodiments, the method 1200 can be implemented in a processing circuit external to the distributed network system 100 in FIG. 1*a* and the resultant compressed DFA is stored in a memory circuit within the network processor 107 in FIG. 1*a*. The method 1200 can also be performed by a compression processing circuit, which can be part of the network processor 107.

The method 1200 begins at block 1202, where a state table or automata having a plurality of states having state transitions is provided. The state table can be a table such as the table 200 shown above. The state table includes the plurality of states organized along a y-axis, also referred to as a state axis. Each state has a plurality of transitions or state transitions. The transitions are organized along an x-axis, also referred to as a character axis.

Horizontal compression is performed on the DFA table at block 1204.

A first stage grouping is performed at block 1206 to generate one or more sets of states for the DFA table. The first stage grouping is performed based on generated bitmaps for each state.

A second stage grouping is performed at block 1208 to regenerate second one or more sets of states for the DFA table. The second stage grouping uses a transition threshold to ensure that states within a set have a minimum number of similar or same transitions.

A conquer step or grouping is performed at block 1210 to regenerate third one or more sets of states based on conquer criteria. The conquer step identifies leader states and combines states if the combination facilitates compression. Examples of performing the conquer step are provided above in FIGS. 9, 10A, 10B and 11 and elsewhere in the specification.

Vertical compression is performed at block 1212 to compress the DFA table. The compressed DFA table is then typically stored. The storage requirements for the compressed DFA table are typically much less than the uncompressed or initial DFA table. The compressed stable is also referred to as a two dimensional compressed state table in that compression has been performed in horizontal and vertical dimensions.

The member state transitions for the combined set can be reduced by choosing a leader state in the state that has a high number of similar transitions at an index position when compared with all other members of the combined state. Of all the states in the combined set, each state is temporarily chosen as the leader and the number of transitions that need be stored among the other states in the combined set is calculated using a compression algorithm. The state that results in the least number of member state transitions is selected as the leader state for that set.

The groups of sets are then compressed to form a compressed state table, also referred to as a compressed DFA. The compressed DFA can be used for packet analysis, including DPI.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a hardware system for signature matching in a distributed network. The hardware system comprises a network processor and a memory. The network processor is configured to perform horizontal compression on a state table using bitmaps, wherein the state table has a plurality of states and state transitions. The processor is also configured to perform a first grouping of states of the state table using the bitmaps to generate a first one or more sets of states, perform a second grouping of states of the state table based on the first one or more sets of states and a transition threshold to generate a second one or more sets of states, perform a conquer step grouping of the states of the state table based on the second one or more sets of states and conquer criteria to generate third one or more sets of states, and generate a two dimensional compressed state table based on the third one or more sets of states. The memory circuit is configured to store the two dimensional compressed state table.

Example 2 is system including the subject matter of example 1, wherein the network processor is further configured to identify an enhanced leader state for each of the third one or more sets of states and one or more combinations of the third one or more sets of states by identifying the state that provides the lowest number of uncompressed transitions per set.

Example 3 is system including the subject matter of any of examples 1-2, including or omitting optional elements, wherein the conquer criteria includes to combine a first set and a second set of the second one or more sets if the first set and the second set have the same bitmap.

Example 4 is system including the subject matter of any of examples 1-3, including or omitting optional elements, wherein the conquer criteria includes to combine a first set and a second set of the second one or more sets based on a number of uncompressed transitions for a combination of the first set and the second set.

Example 5 is system including the subject matter of any of examples 1-4, including or omitting optional elements, wherein the network processor is configured to determine the number of uncompressed transitions for the combination of the first set and the second set by identifying an enhanced leader state.

Example 6 is system including the subject matter of any of examples 1-5, including or omitting optional elements, wherein the enhanced leader state is selected that provides a least number of uncompressed transitions for the combination.

Example 7 is system including the subject matter of any of examples 1-6, including or omitting optional elements, wherein the network processor is configured to perform a plurality of iterations of the conquer step grouping to generate the third one or more sets of states.

Example 8 is system including the subject matter of any of examples 1-7, including or omitting optional elements, wherein the transition threshold indicates that a threshold percentage of transitions of the states in a set are similar to each other.

Example 9 is system including the subject matter of any of examples 1-8, including or omitting optional elements, wherein the transition threshold is 85 percent.

Example 10 is system including the subject matter of any of examples 1-9, including or omitting optional elements, wherein the network processor is configured to perform a similarity check based on the transition threshold, wherein the similarity check identifies states that have similar transitions at indexes.

Example 11 is system including the subject matter of any of examples 1-10, including or omitting optional elements, wherein the network processor is configured to generate a bitmask for each member state in reference to a leader state of a set.

Example 12 is system including the subject matter of any of examples 1-11, including or omitting optional elements, wherein the bitmask includes a '1' to indicate that a transition is stored and a '0' to indicate that a transition is not stored.

Example 13 is system including the subject matter of any of examples 1-12, including or omitting optional elements, wherein the network processor is configured to determine a number of uncompressed transitions for a set of the second one or more sets of states by determining uncompressed transitions for a leader state and determining transitions in member states that differ from the leader state at an index.

Example 14 is a hardware system for signature matching in a distributed network. The hardware system comprises a network processor and a memory. The network processor is configured to receive a state table having a plurality of states and state transitions, perform a conquer step grouping of the states of the state to generate one or more sets of states, and generate a two dimensional compressed state table based on the one or more sets of states. The memory circuit is configured to store the two dimensional compressed state table.

Example 15 is system including the subject matter of example 14, including or omitting optional elements, wherein the network processor is configured to identify an enhanced leader state for a set of states while performing the conquer step grouping.

Example 16 is system including the subject matter of any of examples 14-15, including or omitting optional elements, wherein the network processor is configured to identify an enhanced leader state as the state that provides the least number of uncompressed transitions when the state is used as the leader state.

Example 17 is system including the subject matter of any of examples 14-16, including or omitting optional elements, wherein the network processor generates one or more initial sets for the state table, where each of the initial sets includes an enhanced leader state and zero or more member states.

Example 18 is a method of operating a network processor. The method includes providing a state table having a plurality of states and state transitions, performing horizontal compression on the state table, performing first stage grouping of the plurality of states to generate first one or more sets of states, performing conquer step grouping of the first one or more sets of states using conquer criteria to generate final one or more sets of states and performing vertical compression of the state table using the final one or more states to generate a compressed state table that represents a database of digital signatures.

Example 19 is method including the subject matter of example 18, including or omitting optional elements, wherein performing the conquer step grouping includes identifying an enhanced leader state for each of the first one or more sets of states.

Example 20 is system including the subject matter of any of examples 18-19, including or omitting optional elements, further comprising performing deep packet inspection (DPI) of network traffic using the compressed state table.

Example 21 is a system for signature matching. The system includes a means for performing horizontal compression on a state table having a plurality of states and state transitions, a means for performing first stage grouping on the state table to generate first one or more sets of states, a means for performing second stage grouping based on the first one or more sets of states and a transition threshold to generate a second one or more sets of states, a means for performing a conquer step grouping based on the second one or more sets and conquer criteria to generate a third one or more sets of states, and a means to generate a dimensioned compressed state table based on the third one or more sets of states.

Example 22 is system including the subject matter of example 21, including or omitting optional elements, further comprising a means to store the two dimensional compressed state table.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A hardware system for signature matching in a distributed network system, the hardware system comprising:
a network processor configured to:
perform horizontal compression on a state table using bitmaps, wherein the state table has a plurality of states and state transitions;
perform a first grouping of states of the state table using the bitmaps to generate a first one or more sets of states;
perform a second grouping of states of the state table based on the first one or more sets of states and a transition threshold to generate a second one or more sets of states;
perform a conquer step grouping of the states of the state table based on the second one or more sets of states and conquer criteria to generate third one or more sets of states; and
generate a two dimensional compressed state table based on the third one or more sets of states; and a memory circuit configured to store the two dimensioned compressed state table.

2. The system of claim 1, wherein the network processor is further configured to identify an enhanced leader state for each of the third one or more sets of states and one or more combinations of the third one or more sets of states by identifying the state that provides the lowest number of uncompressed transitions per set.

3. The system of claim 1, wherein the conquer criteria includes to combine a first set and a second set of the second one or more sets if the first set and the second set have the same bitmap.

4. The system of claim 1, wherein the conquer criteria includes to combine a first set and a second set of the second one or more sets based on a number of uncompressed transitions for a combination of the first set and the second set.

5. The system of claim 4, wherein the network processor is configured to determine the number of uncompressed transitions for the combination of the first set and the second set by identifying an enhanced leader state.

6. The system of claim 5, wherein the enhanced leader state is selected that provides a least number of uncompressed transitions for the combination.

7. The system of claim 1, wherein the network processor is configured to perform a plurality of iterations of the conquer step grouping to generate the third one or more sets of states.

8. The system of claim 1, wherein the transition threshold indicates that a threshold percentage of transitions of the states in a set are similar to each other.

9. The system of claim 8, wherein the transition threshold is 85 percent.

10. The system of claim 1, wherein the network processor is configured to perform a similarity check based on the transition threshold, wherein the similarity check identifies states that have similar transitions at indexes.

11. The system of claim 1, wherein the network processor is configured to generate a bitmask for each member state in reference to a leader state of a set.

12. The system of claim 11, wherein the bitmask includes a '1' to indicate that a transition is stored and a '0' to indicate that a transition is not stored.

13. The system of claim 1, wherein the network processor is configured to determine a number of uncompressed transitions for a set of the second one or more sets of states by determining uncompressed transitions for a leader state and determining transitions in member states that differ from the leader state at an index.

14. A method of operating a network processor, the method comprisii providing a state table having a plurality of states and state transitions;
performing horizontal compression on the state table;
performing first stage grouping of the plurality of states to generate first one or more sets of states;
performing conquer step grouping of the first one or more sets of states using conquer criteria to generate final one or more sets of states; and
performing vertical compression of the state table using the final one or more states to generate a compressed state table that represents a database of digital signatures.

15. The method of claim 14, wherein performing the conquer step grouping includes identifying an enhanced leader state for each of the first one or more sets of states.

16. The method of claim 14, further comprising performing deep packet inspection (DPI) of network traffic using the compressed state table.

* * * * *